April 18, 1944.  J. MAHLER  2,346,774

MEANS FOR FORMING IMAGES

Filed March 27, 1941

Joseph Mahler
INVENTOR.
BY Donald L. Brown
Attorney

Patented Apr. 18, 1944

2,346,774

UNITED STATES PATENT OFFICE 2,346,774

MEANS FOR FORMING IMAGES

Joseph Mahler, Brookline, Mass., assignor to Polaroid Corporation, Dover, Del., a corporation of Delaware Application March 27, 1941, Serial No. 385,432

3 Claims. (Cl. 88—29)

This invention relates to devices for use in the preparation of superimposed light-polarizing images, particularly stereoscopic light-polarizing images.

It is one object of the invention to provide means for facilitating the simultaneous formation of a pair of superimposed light-polarizing images on opposite sides of a sheet of suitably molecularly oriented plastic material.

Another object is to provide such means in the form of a pair of hingedly connected sheets of plastic material each bearing on the side adjacent the other a relief of water-absorbing material defining an image of which it is desired to form a light-polarizing reproduction.

Further objects are to provide such a device wherein the images on each of said sheets bear a predetermined relation to each other; to provide such a device wherein said images are respectively left and right eye stereoscopic images, and to provide such a device wherein said sheets and reliefs comprise conventional photographic gelatin reliefs.

Figure 1A:
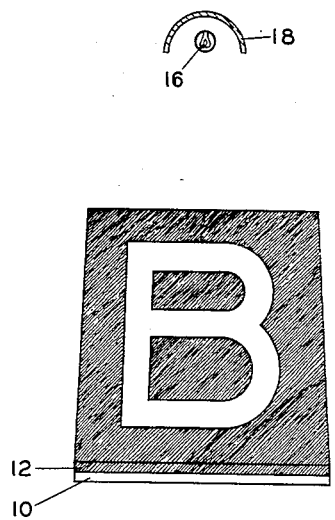
Figure 1B:
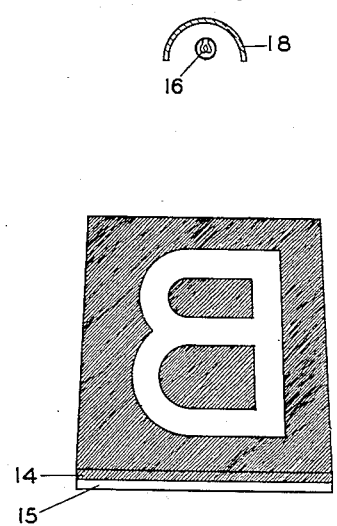
Figure 2:
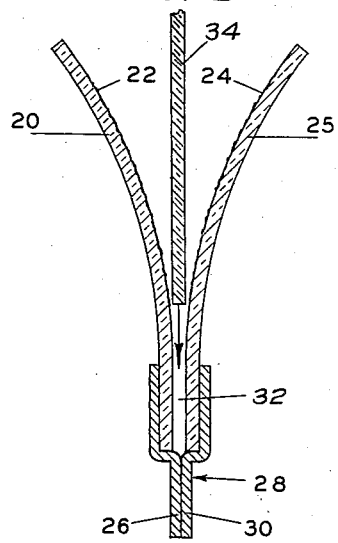

Still further objects will in part be apparent and will in part be pointed out in the course of the following detailed description of one embodiment of the invention, which is given as a non-limiting example, together with the accompanying drawing, in which:

Figures 1a and 1b are somewhat diagrammatic views illustrating the step of exposing light-sensitive, wash-off gelatin relief films to light through a pair of photographic negatives of which it is desired to form a positive stereoscopic print comprising superimposed light-polarizing images; and Fig. 2 is a diagrammatic view in section of a pair of reliefs formed as in the manner shown in Figs. 1a and 1b and joined together to form an embodiment of the invention, said view also showing a sheet of plastic material being operatively positioned between said reliefs.

It has been proposed to reproduce light-polarizing images, and particularly stereoscopic light-polarizing images, by printing one image of a stereoscopic pair on one surface of a sheet of suitably molecularly oriented plastic such as polyvinyl alcohol and by similarly printing the other image on the opposite surface of said sheet, the two surfaces having their respective directions of molecular orientation relatively perpendicular. It is desirable in this case that both images be printed simultaneously, and the present invention provides simple and efficient means for bringing about this result.

Referring to Fig. 2, elements 20 and 25 represent sheets of plastic material each of which bears on the side adjacent the other a relief, indicated at 22 and 24, of water-absorbing material such as gelatin. Each of reliefs 22 and 24 defines in terms of thickness a predetermined image. Said images may together comprise a stereoscopic pair, or they may bear any other predetermined relation to each other. For example, they may comprise "before and after" pictures such as an architect's drawing and a photograph of the finished building. They may even have no mutual relation whatever without departing from the scope of the invention.

In a preferred embodiment of the invention, sheets 20 and 25 are assembled with the reliefs thereon in face-to-face relation as shown in Fig. 2, and with the images defined by said reliefs in predetermined relative registry, as will be explained in more detail hereinafter in connection with stereoscopic pictures. They are then provided with a suitable hinged connection 30 along one edge. A particularly convenient way of securing such a connection is by means of overlapping strips 26 and 28 of adhesive tape such as masking tape. The important consideration with respect to connection 30 is that it be of such character that it will prevent relative sidewise displacement of sheets 20 and 25. The hinge element should also be of a type adapted to permit the sheets 20 and 25 to lie flat against the surfaces of a relatively thick sheet of plastic material inserted in space 32 therebetween.

When printing from the device shown in Fig. 2, the two sheets 20 and 25 are first imbibed in an aqueous solution of the desired dichroic dye until the water-absorbing material of the reliefs 22 and 24 is saturated with the solution. A suitably molecularly oriented sheet 34 of the desired plastic is then placed between the reliefs, and the entire device passed through a roller press. During this step, the dye solution absorbed by the reliefs transfers to the plastic sheet and so reproduces thereon in stained areas the images defined by the reliefs.

One of the simplest ways of preparing the device of the invention is to use conventional photographic colloid reliefs such as the type known as gelatin "wash-off" reliefs.

One of the chief uses for the device of the invention is in the printing of superimposed stereoscopic images, and Figs. 1a and 1b illustrate an important consideration to be observed in the preparation of reliefs for this purpose. In Figs. 1a and 1b, elements 10 and 15 represent sheets of photographic, light-sensitive, gelatin wash-off relief film. Elements 12 and 14 represent photographic negatives, which are assumed to comprise together a stereoscopic pair. Figs. 1a and 1b illustrate the step of exposing each of films 10 and 15 through one of negatives 12 or 14 to light from any source such as bulb 16 provided with a conventional reflector 18.

In Fig. 1a, it will be noted that the image in negative 12 appears with right and left in the proper relationship, that is to say, with the emulsion side of the negative down or on the side adjacent film 10. In Fig. 1b, on the other hand, negative 14 is positioned with its emulsion side up or away from film 15. Thus, when films 10 and 15 are processed in the conventional manner, each will carry a gelatin relief defining in terms of thickness the image carried by the negative through which it was exposed. However, since the two negatives were exposed from opposite sides, the image carried by one relief will be reversed from right to left with respect to the image carried by the other relief. Thus, when they are superimposed and joined as shown in Fig. 2, one relief, carried by film 10, will be properly positioned to print on the front surface of an oriented plastic sheet, and the other, carried by film 15, will be properly positioned to print on the back surface of said plastic sheet. Thus in Fig. 2, sheet 20 may be understood as representing 10 in Fig. 1a after processing thereof, and sheet 25 will then correspond similarly to sheet 15.

Reference has been made hereinabove to positioning sheets 20 and 25 so that the images thereon are in predetermined relative registry. In the case of stereoscopic images, the preferred registry will be such that when the resulting print is viewed stereoscopically, as for example in the manner described in United States Patent No. 2,203,687, the objects therein will appear in the desired spacial relation with respect to the plane of the sheets. This registry may be altered, however, if special effects are desired. As to the registry of images other than a stereoscopic pair, this will depend largely upon the nature of the images, their relation to each other, if any, and the effect it is desired to produce.

Since certain changes may be made in the above article and different embodiments of the invention could be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. An article of manufacture comprising a pair of sheets of plastic material, each of said sheets carrying thereon a relief comprising water-absorbing material, each of said reliefs defining a predetermined image, said images comprising respectively right and left eye stereoscopic images, one of said images being reversed from right to left with respect to the other said image, said sheets being positioned with the relief thereon in face-to-face relation and with said images in relative stereoscopic registry, and means providing a hinged connection between said sheets along an edge thereof, said reliefs being adapted to absorb aqueous solutions of dichloric dyes and to transfer said solutions to a sheet of molecularly oriented polyvinyl alcohol when brought into contact therewith.

2. An article of manufacture comprising a pair of sheets of plastic material, each of said sheets bearing thereon a gelatin relief defining a predetermined image, said images comprising respectively right and left eye stereoscopic images, one of said images being reversed from right to left with respect to the other said image, said sheets being positioned with the reliefs thereon in face-to-face relation and with said images in relative stereoscopic registry, and means providing a hinged connection between said sheets along an edge thereof, said hinge means being adapted to hold said sheets in spaced relation whereby said reliefs are adapted to receive therebetween and to lie smoothly against opposite surfaces of a third sheet of plastic material.

3. An article of manufacture comprising a pair of sheets of plastic material, each of said sheets carrying thereon a relief comprising water-absorbing material, each of said reliefs defining a predetermined image, said images comprising respectively right and left eye stereoscopic images, one of said images being reversed from right to left with respect to the other said image, said sheets being positioned with the reliefs thereon in face-to-face relation and with said images in relative stereoscopic registry, and means providing a hinged connection between said sheets along an edge thereof, said connection means comprising adhesive tape, said hinge means being adapted to hold said sheets in spaced relation whereby said connected sheets are adapted to receive therebetween and to lie smoothly against opposite surfaces of a third sheet of plastic material

JOSEPH MAHLER.